T. EARLE.
Fruit Jar.
No. 40,556.            Patented Nov. 10, 1863.
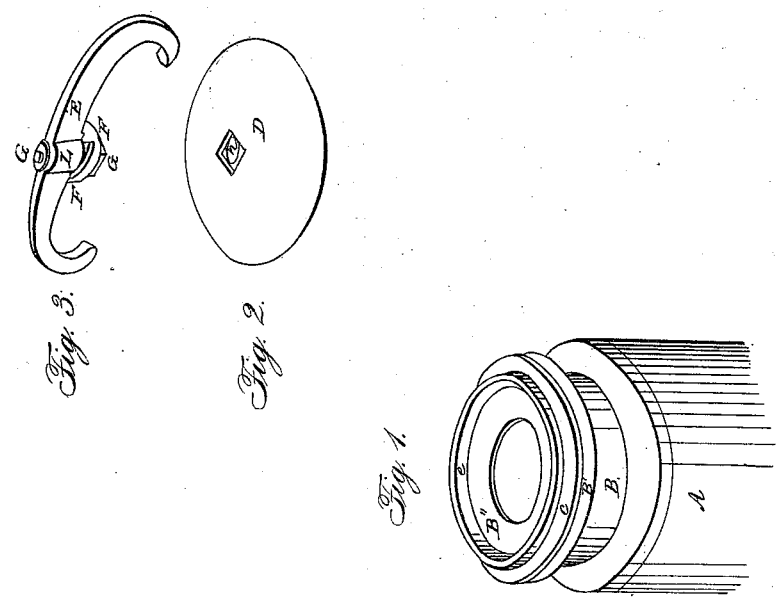
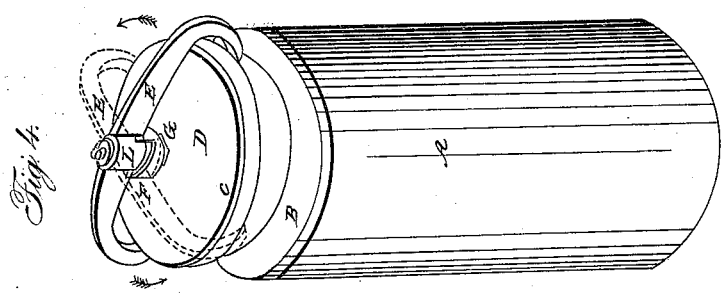
Witnesses:            Inventor:
B. F. Thurston            Timothy Earle
J. H. Peabody

UNITED STATES PATENT OFFICE.

TIMOTHY EARLE, OF SMITHFIELD, RHODE ISLAND.

IMPROVEMENT IN PRESERVE CANS, JARS, &c.

Specification forming part of Letters Patent No. 40,556, dated November 10, 1863.

*To all whom it may concern:*

Be it known that I, TIMOTHY EARLE, of Smithfield, in the county of Providence and State of Rhode Island, have invented a new and useful Improvement in Self-Sealing Preserve-Cans; and I do hereby declare that the following specification, taken in connection with the drawings making a part of the same, is a full, clear, and exact description thereof.

Figure 1 exhibits the jar with the cover removed. Fig. 2 represents the cover with its air-vent. Fig. 3 shows the means by which the cover is sealed to the jar and the air-vent closed. Fig. 4 is a view of the entire jar as it appears with the cover in place.

Various devices have been resorted to for making cans and jars for holding preserved fruits and vegetables impervious to air at the mouth by mechanical means, so as to admit of the repeated use of the same can for similar purposes. The principle which has been found to be the best, and practically the most convenient, is the one where the cover and the jar are mechanically held together and the joint made tight with a packing-ring of rubber or similar material. For the purpose of thus holding the cover upon the jar and compressing the packing, several arrangements are in common use, one of which is to make two inclined planes opposite to each other and upon the under side of a lip, which surrounds the mouth of the jar, and by a clamp similar to the bar E in Fig. 3 secure the cover to the jar by forcing the ends of the clamp to ascend the faces of the inclined planes. In my invention, while I have made use of inclined planes and a clamp for the purpose of compressing the packing-ring and securing the cover to the jar, I have arranged the inclined planes so as to obtain the increased leverage due to the change in its location from the periphery of the jar to the center of the cover.

Another and the principal feature of my invention consists in a means for removing the difficulty which always attends the opening of jars which are hermetically sealed, due to the pressure of the atmosphere upon the outer surface. This difficulty is so great that it often happens that the jar is fractured or the cover rendered worthless for subsequent use in the attempt to raise it. It is obvious that an air-vent will equalize the pressure; but it is also requisite that when the jar is in use the vent should be perfectly tight, and it is very desirable, on account of convenience in using, that it should be opened and closed by mechanical means. I have accomplished this result by the use of a vent so contrived and arranged that it shall be securely closed while the cover is fastened on, but is opened by the act of removing the clamp to take off the cover.

In the accompanying drawings, A represents the jar or can. The neck B is furnished with a flange, B', upon which is placed a packing-ring, C, of rubber.

D is the cover, of sufficient diameter to have its edge rest upon the ring. In the center of the cover a square mortise is made to the depth of one-half the thickness of the cover, to receive the end of the axle upon which the clamp-yoke presently to be described turns, and at the bottom of the mortise and through the cover a hole is made sufficiently large to admit the air freely to the interior of the jar. When the cover is in use, the hole is covered with a small patch, $h$, of rubber or any other convenient packing.

E, Fig. 3, is a yoke-clamp provided with an axle, G, squared at its lower end, upon which it turns. This axle has also upon it the two inclined planes, F F, against which the lower edge of the yoke E can be made to bear. The method of closing the jar is to place the cover over the mouth, with its outer edge bearing upon the packing-ring. The squared end of the axle G is placed in the mortise in the cover, and with the patch of rubber previously mentioned closes the air-vent. The extremities of the yoke bear against the under side of the flange B', so that when the yoke is turned so as to bear against the faces of the inclined planes F F the cover will be pressed into the packing-ring, and at the same time the patch $h$ be with equal force pressed over the air-vent. When it is desired to open the jar, the act of turning the yoke in the opposite direction from that in which it was turned to secure the cover will relieve the pressure of the patch $h$ upon the air-vent. By this arrangement the same jar can be used repeatedly without any inconvenience in opening.

It is clear that, instead of a yoke with inclined planes and a square shank, as above shown, a yoke with a thumb-screw passing through its center and an air-vent, to be closed with a patch, or otherwise located directly under the point of the screw and held down by it, would accomplish the same useful result.

What I claim as my invention, and desire to secure by Letters Patent, is—

The method, substantially as described, of controlling the air-vent to a preserve can or jar by causing the same pressure which holds the cover upon the jar to secure the vent and the same motion which unfastens the cover to relieve the vent, as herein set forth.

TIMOTHY EARLE.

Witnesses:
　BENJ. F. THURSTON,
　T. H. PEABODY.